(12) United States Patent
Hayashida et al.

(10) Patent No.: US 7,871,685 B2
(45) Date of Patent: Jan. 18, 2011

(54) METHODS FOR PRODUCING OPTICAL RECORDING MEDIUM AND OPTICAL RECORDING MEDIUM

(75) Inventors: Naoki Hayashida, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 1652 days.

(21) Appl. No.: 11/101,423

(22) Filed: Apr. 8, 2005

(65) Prior Publication Data

US 2005/0248881 A1 Nov. 10, 2005

(30) Foreign Application Priority Data

Apr. 8, 2004 (JP) .................. P. 2004-114538

(51) Int. Cl.
*B32B 3/02* (2006.01)
(52) U.S. Cl. ................. 428/64.1; 428/64.4; 430/270.11
(58) Field of Classification Search ................ 428/64.1, 428/64.4; 430/270.11
See application file for complete search history.

(56) References Cited

U.S. PATENT DOCUMENTS

| | | | |
|---|---|---|---|
| 5,496,870 A * | 3/1996 | Chawla et al. ................. | 522/90 |
| 6,486,225 B1 * | 11/2002 | Kamata et al. ................. | 522/14 |
| 6,582,884 B1 * | 6/2003 | Myers ..................... | 430/273.1 |
| 6,809,127 B2 * | 10/2004 | Dones et al. ................. | 522/176 |
| 2003/0162860 A1 * | 8/2003 | Ohno et al. .................. | 522/173 |
| 2004/0010111 A1 * | 1/2004 | Birkett et al. .................. | 528/44 |

FOREIGN PATENT DOCUMENTS

| | | |
|---|---|---|
| JP | 2001-2744 | 1/2001 |
| JP | 2002-256053 | 9/2002 |
| JP | 2004-35599 | 2/2004 |
| JP | 2004-35600 | 2/2004 |
| JP | 2004-244426 | 9/2004 |

* cited by examiner

*Primary Examiner*—Elizabeth Mulvaney
(74) *Attorney, Agent, or Firm*—Oblon, Spivak, McClelland, Maier & Neustadt, L.L.P.

(57) ABSTRACT

The present invention provides a method for producing an optical recording medium having: a supporting substrate; a light transmission layer, which transmits a laser beam; and an information layer formed between the supporting substrate and the light transmission layer, which includes: applying a resin composition on the information layer by a spin coating method to form a coating film, wherein the resin composition contains, as main components: (A) a radical-curing urethane (meth)acrylate, which is obtained by reacting (a-1) a compound having three or more isocyanate groups binding to an aliphatic carbon atom per one molecule thereof and (a-2) a polycaprolacton-modified hydroxyethyl(meth)acrylate; and (B) a radical-curing monomer having a viscosity of 400 mPa.s or less at 25° C., curing the coating film by irradiating the coating film with an ultraviolet light or an electron beam to form the light transmission layer.

28 Claims, 1 Drawing Sheet

METHODS FOR PRODUCING OPTICAL RECORDING MEDIUM AND OPTICAL RECORDING MEDIUM

FIELD OF THE INVENTION

The present invention relates to a method for producing an optical recording medium. More specifically, the present invention relates to a method for producing an optical recording medium by which a light transmission layer, which is excellent in terms of scratch resistance and light transmission property, can be produced by means of a spin coating method, and by which an optical recording medium whose warping can effectively be suppressed can be produced at a low cost and a high productivity.

BACKGROUND OF THE INVENTION

While an optical recording medium such as a CD or DVD has widely been employed as a recording medium for recording digital data, recently a next generation of an optical recording medium having a larger capacity and a higher data transfer rate began to be developed extensively.

Such a next generation optical recording medium necessarily have an extremely reduced beam spot diameter of the laser beam employed for recording and reading the data for the purpose of increasing the recording capacity and achieving an extremely high data transfer rate.

In order to reduce the laser beam spot diameter, the numerical aperture (NA) of an object lens for converging the laser beam needs to be 0.7 or higher, for example, as high as about 0.85, while the wavelength (λ) of the laser beam needs to be 450 nm or less, for example as short as about 400 nm.

In addition, for the purpose of recording data on an optical recording medium with a reduced laser beam spot diameter while enabling a readout of the data from the optical recording medium, a coma aberration W represented by the following Equation (1) needs to be kept at a small value.

$$W = \frac{d \cdot (n^2 - 1) \cdot n^2 \cdot \sin\theta \cdot \cos\theta \cdot (NA)^3}{2\lambda(n^2 - \sin^2\theta)^{\frac{5}{2}}} \quad (1)$$

In Equation (1), n is a refractive index of the light transmission layer, and θ is the deviation of the optical axis of the laser beam.

As evident from Equation (1), a reduction in the laser beam wavelength λ in combination with an increase in the object lens numerical aperture NA leads to a drastic increase in the coma aberration W and the coma aberration W is dependent on the optical axis deviation θ, and accordingly when using a laser beam of a short wavelength λ together with an object lens having a large numerical aperture NA a change in the optical axis θ leads to a substantial variation in the coma aberration W, resulting in a reduction in the tolerance toward the change in the optical axis θ, namely, the tilt margin.

Accordingly, for the purpose of reducing the laser beam wavelength λ and increasing the object lens numerical aperture NA while keeping the tilt margin at a level similar to that of a conventional optical recording medium such as a DVD, the thickness d of the light transmission needs to be reduced, and for example in the case employing a laser beam at a wavelength of about 400 nm and an object lens whose numerical aperture NA is about 0.85 the thickness d of the light transmission needs to be as small as 100 μm.

Therefore, unlike to a currently employed optical recording medium such as DVD, a next generation optical recording medium suffers from a difficulty in forming a layer such as a recording layer on a support substrate having a light transmissibility enabling an incidence of a laser beam, and eventually a method for forming as a light transmission layer having a light transmissibility enabling an incidence of a laser beam a resin layer as thin as about 100 μm on an information layer including a recording layer formed on the support substrate is proposed.

As a method for forming a light transmission layer whose thickness is about 100 μm, a method in which a resin film formed from a material having a light transmissibility is laminated on an information layer to form a light transmission layer or a method in which a resin composition solution is coated on an information layer by a spin coating method and an ultraviolet light or an electron beam is irradiated to effect a curing whereby forming a light transmission layer is proposed.

Also since a light transmission layer formed in a next generation optical recording medium is a layer enabling an incidence and a transmission of a laser beam as described above. Any scratch on its surface causes a diffused reflection of the laser beam which leads to a difficulty in effecting a recording of data on the information layer of an optical recording medium as desired and a readout from the information layer of the optical recording medium. Therefore, the light transmission layer needs to have a surface which is difficult to be scratched and is excellent in terms of the scratch resistance. At the same time, the light transmission layer needs to have a high light transmittance in the range of the wavelength of a laser beam employed for recording and reading the data, since the laser beam is focused on the information layer in the optical recording medium through the light transmission layer when the recording of data on the information layer of an optical recording medium and a readout from the information layer of the optical recording medium.

Nevertheless, an attempt to form a light transmission layer by laminating a resin film molded from a material having a light transmissibility on an information layer leads to an increased cost, since such a resin film having a light transmissibility and excellent optical characteristics is very expensive and such a formation of the light transmission layer by laminating the resin films suffers from a markedly reduced productivity.

On the other hand, when a light transmission layer is formed by applying a solution of a resin composition on an information layer and curing the resin composition by irradiating with an ultraviolet light or an electron beam, there has been a problem that the resin composition shrinks upon curing, resulting in a warp formed in an optical recording medium.

Especially, an attempt to form a light transmission layer using a resin composition having a high hardness in order to obtain a highly scratch resistant light transmission layer poses a need of using a resin composition having a high crosslinking density, which allows the resin composition to undergo a further increased shrinkage upon curing, resulting in a substantial warp formed in an optical recording medium.

Accordingly, in order to ensure the prevention of the warping of an optical record medium, it is required to form a light transmission layer using a resin composition having a reduced shrinkage upon curing.

Nevertheless, the formation of a light transmission layer using a resin composition undergoing a reduced shrinkage upon curing leads to a reduced hardness of the light transmission layer which allows the surface of the light transmission layer to be scratched readily, resulting in a problem of a reduced scratch resistance.

While such a problem can be solved by providing a protective layer such as a hard coat layer formed from a material having a high hardness on the surface of a light transmission layer, the formation of the protective layer such as a hard coat layer on the surface of the light transmission layer leads not only to an increased production cost of the optical recording medium but also a markedly poor productivity.

Accordingly, an object of the present invention is to provide a method for producing an optical recording medium by which a light transmission layer having excellent scratch resistance and light transmissibility can be formed by a spin coating method and by which an optical recording medium whose warping is suppressed effectively can be produced at a low cost and a high productivity. Another object of the present invention is to provide an optical recording medium having a light transmission layer having excellent scratch resistance and light transmissibility, wherein a warping of the optical recording medium is suppressed effectively.

SUMMARY OF THE INVENTION

The present inventors have made eager investigation to examine the problem. As a result, it has been found that a light transmission layer having excellent scratch resistance and light transmissibility and having a high light transmittance for a laser beam whose wavelength is 380 nm to 450 nm can be formed by applying a resin composition on the information layer by a spin coating method to form a coating film, wherein the resin composition contains, as main components; (A) a radical-curing urethane (meth)acrylate, which is obtained by reacting (a-1) a compound having three or more isocyanate groups binding to an aliphatic carbon atom per one molecule thereof and (a-2) a polycaprolacton-modified hydroxyethyl (meth)acrylate; and (B) a radical-curing monomer having a viscosity of 400 mPa·s or less at 25° C., curing the coating film by irradiating the coating film with an ultraviolet light or an electron beam to form the light transmission layer. Furthermore, it has been also found that the shrinkage of the resin composition upon curing can be reduced, whereby enabling the production of an optical recording medium whose warping is suppressed effectively. Still furthermore, it has been also found that, because of a simple spin coating of a resin composition on the information layer to form a light transmission layer without any need to provide a protective layer such as a hard coat layer on the surface of the light transmission layer, it became possible to produce an optical recording medium whose warping is suppressed effectively at a low cost and a high productivity.

Based on the findings described above, the object of the invention described above can be accomplished by a method for producing an optical recording medium having: a supporting substrate; a light transmission layer, which transmits a laser beam; and an information layer formed between the supporting substrate and the light transmission layer, which comprises: applying a resin composition on the information layer by a spin coating method to form a coating film, wherein the resin composition contains, as main components: (A) a radical-curing urethane (meth)acrylate, which is obtained by reacting (a-1) a compound having three or more isocyanate groups binding to an aliphatic carbon atom per one molecule thereof and (a-2) a polycaprolacton-modified hydroxyethyl (meth)acrylate; and (B) a radical-curing monomer having a viscosity of 400 mPa·s or less at 25° C., curing the coating film by irradiating the coating film with an ultraviolet light or an electron beam to form the light transmission layer.

Furthermore, the another object of the present invention can be accomplished by an optical recording medium comprising: a supporting substrate; a light transmission layer, which transmits a laser beam; and an information layer formed between the supporting substrate and the light transmission layer, wherein the light transmission layer is produced by: applying a resin composition on the information layer by a spin coating method to form a coating film, wherein the resin composition contains, as main components: (A) a radical-curing urethane(meth)acrylate, which is obtained by reacting (a-1) a compound having three or more isocyanate groups binding to an aliphatic carbon atom per one molecule thereof and (a-2) a polycaprolacton-modified hydroxyethyl (meth)acrylate; and (B) a radical-curing monomer having a viscosity of 400 mPa·s or less at 25° C., curing the coating film by irradiating the coated film with an ultraviolet light or an electron beam.

Still furthermore, the another object of the present invention can be also accomplished by an optical recording medium comprising; a supporting substrate; a light transmission layer, which transmits a laser beam; and an information layer formed between the supporting substrate and the light transmission layer, wherein the light transmission layer has a hardness lower than that of the supporting substrate.

As used herein, the phrase "a resin composition contains, as main components, (A) a radical-curing urethane(meth) acrylate and (B) a radical-curing monomer" means; not only the case in which the resin composition contains only the radical-curing urethane(meth)acrylate (A) and the radical-curing monomer (B); but also the case in which the resin composition contains various additives for improving the characteristics of a light transmission layer in addition to the radical-curing urethane(meth)acrylate (A) and the radical-curing monomer (B); and a case in which the resin composition contains radical-curing compounds other than the radical-curing urethane(meth)acrylate (A) and the radical-curing monomer (B) in addition to the radical-curing urethane(meth) acrylate (A) and the radical-curing monomer (B).

In the invention, an aliphatic carbon atom means a carbon atom other than a carbon atom constituting an aromatic ring and also is a carbon atom which constitutes an aliphatic hydrocarbon group, wherein the hydrocarbon group may be saturated or unsaturated. It is preferable that an isocyanate group in a compound having three or more isocyanate groups in a molecule is bound to an aliphatic hydrocarbon, since the light transmittance of a resultant light transmission layer becomes high whereby allowing the light transmittance of the light transmission layer to be kept at a sufficiently high level even after storing the optical recording medium for a prolonged period.

While the atmosphere in which an ultraviolet light or an electron beam is irradiated is not limited particularly in the invention, it is preferred to irradiate the ultraviolet light or an electron beam in air at ambient temperature (25° C.) to about 100° C. Also in the invention, the ultraviolet light or an electron beam may be irradiated in a dose sufficient to set a resin composition, and the ultraviolet light dose or the electron beam absorption dose is not limited particularly, and may be irradiated to the resin composition in 2 or more divided doses.

Similarly, the condition under which a resin composition is coated onto an information layer is not limited particularly.

In the invention, it is preferable that a resin composition is substantially free from a solvent. As used herein, the phrase "a resin composition is substantially free from a solvent" means that a non-reactive volatile solvent is not employed intentionally when preparing the resin composition, and it is acceptable that any solvent which was employed for preparing a constituent of the resin composition and which still remained in the constituent of the resin composition is contained in the resin composition. Specifically, 5% by weight or less of a non-reactive volatile solvent may be contained in a resin composition.

As used herein, a non-reactive volatile solvent is defined as an organic liquid which is not radically polymerizable, and whose boiling point under 1 atm is 200° C. or lower.

Use of a resin composition containing a solvent when forming an light transmission layer whose thickness is about 100 µm by a spin coating method leads to an increase cost and a need of solvent disposal processes such as drying, resulting in a problematic reduction in the productivity of an optical recording medium. Even if the solvent disposal processes such as drying are conducted, it is difficult to remove the solvent completely from the bottom of the coating film which is as deep as 100 µm, and an adverse effect on the light transmission layer such as blistering the light transmission layer or an uneven coating on the surface of the transmission layer may arise.

On the contrary, when a resin composition is substantially free from a solvent, a light transmission layer can be formed only by coating the resin composition on an information layer by a spin coating method to form a coating film followed by curing the resin composition by an irradiation with an ultraviolet light or an electron beam, whereby enabling a production of an optical recording medium at a low cost and a high productivity.

In the invention, a resin composition preferably contains, as main components, 40 to 95 parts by weight of the radical-curing urethane(meth)acrylate (A), and 5 to 60 parts by weight of the radical-curing monomer (B).

When a resin composition preferably contains, as main components, 40 to 95 parts by weight of the radical-curing urethane(meth)acrylate (A), and 5 to 60 parts by weight of the radical-curing monomer (B), the resin composition has characteristics appropriate for being coated by a spin coating Method, and the spin coating method serves to provide a more uniform light transmission layer.

In the invention, it is preferable the resin composition further contains 1 to 5% by weight of (C) a photopolymerization initiator when the curing of the resin composition is conducted by an irradiation with an ultraviolet light. On the other hand, the resin composition may not contain the photopolymerization initiator (C) when the curing of the resin composition is conducted by an irradiation of an electron beam.

In the present invention, an acetophenone-based photopolymerization initiator means a photopolymerization initiator having an acetophenone skeleton, and a benzophenone-based photopolymerization initiator means a photopolymerization initiator having a benzophenone skeleton.

It is preferable that the photopolymerization initiator (C) is an acetophenone-based photopolymerization initiator represented by Formula (1) shown below, and/or a benzophenone-based photopolymerization initiator represented by Formula (2) shown below, and which is free from a compound having a thioxanthone skeleton represented by Formula (3) shown below, phosphine oxide skeleton represented by Formula (4) shown below or titanocene skeleton represented by Formula (5) shown below.

(1)

(2)

In Formula (1), $R_1$ to $R_8$ represent a hydrogen atom; a halogen atom such as a fluorine atom, chlorine atom, bromine atom and iodine atom; a hydroxyl group, amino group or mercapto group; or; a hydrocarbon group optionally containing an oxygen atom, nitrogen atom and sulfur atom, and may be same or different, and any adjacent two may be taken together with a carbon atom to which they are attached to form a ring structure.

In Formula (2), $R_1$ to $R_5$ and $R'_1$ to $R'_5$ represent hydrogen atom; a halogen atom such as a fluorine atom, chlorine atom, bromine atom and iodine atom; a hydroxyl group, amino group or mercapto group; or; a hydrocarbon group optionally containing an oxygen atom, nitrogen atom and sulfur atom, and may be same or different, and any adjacent two may be taken together with a carbon atom to which they are attached to form a ring structure.

(3)

(4)

(5)

In Formulae (3) and (5), $R_{11}$ to $R_{14}$ and $R'_{11}$ to $R'_{14}$ represent hydrogen atom; a halogen atom such as a fluorine atom, chlorine atom, bromine atom and iodine atom; a hydroxyl group, amino group or mercapto group; or; a hydrocarbon group optionally containing an oxygen atom, nitrogen atom and sulfur atom, and may be same or different, and any adjacent two may be taken together with a carbon atom to which they are attached to form a ring structure.

In Formula (5), $R''_1$ and $R''_2$ represent hydrogen atom; a halogen atom such as a fluorine atom, chlorine atom, bromine atom and iodine atom; a hydroxyl group, amino group or mercapto group; or; a hydrocarbon group optionally containing an oxygen atom, nitrogen atom and sulfur atom, and may be same or different, and any adjacent two may be taken together with a titanium atom to which they are attached to form a ring structure.

In Formula (4), $R_{11}$ to $R_{13}$ represent a hydrocarbon group optionally containing an oxygen atom, nitrogen atom and sulfur atom, and may be same or different, and any adjacent two may be taken together with a phosphorus atom to which they are attached to form a ring structure.

A light transmission layer formed from a resin composition containing the photopolymerization initiator (C) has a high light transmittance for a laser beam having a wavelength of 380 nm to 450 nm.

In the invention, it is preferable that the resin composition further contains 0.1 to 5% by weight of (D) a lubricant, which is at least one selected from a group consisting of a fatty acid ester-based lubricant, a silicone-based lubricant and a fluorine compound-based lubricant.

When a resin composition contains the lubricant (D), the lubricity of the surface of a light transmission layer can further be improved, and, accordingly, when subjecting data to recording on and readout from a next generation optical recording medium a scratch on the surface of the light transmission layer of the optical recording medium can effectively be prevented even if the surface of the optical recording medium is brought into contact with a pickup.

In the invention, it is more preferable that the lubricant (D) has one radical-reactive group per one molecule thereof, and has a molecular weight of 10,000 or less.

A molecular weight of the lubricant (D) not higher than 10,000 serves to ensure a mobility of the lubricant (D) in a resin composition which allows the lubricant (D) to be localized near the surface of a light transmission layer, while the possession of at least one radical-reactive group by the lubricant (D) in the molecule serves to allow the lubricant (D) localized near the surface of a light transmission layer to react with the (meth)acrylate (A) and the radical-curing monomer (B) whereby accomplishing immobilization near the surface of the light transmission layer, resulting in a further improvement in the lubricity of the surface of the light transmission layer.

While a radical-reactive group is not limited in the invention as long as it is a group capable of being subjected to a radical polymerization by an irradiation with an ultraviolet light or an electron beam, it is preferably $CH_2=C(R)$ (in which R is a hydrogen atom or a methyl group), more preferably a (meth)acrylate group $CH_2=C(R)$—COO— group (in which R is a hydrogen atom or a methyl group).

In the invention, when a resin composition contains (D) a lubricant, it is preferred that an ultraviolet light or an electron beam is irradiated under an oxygen-poor atmosphere of an oxygen concentration of 1,000 ppm or less, for example, in an atmosphere of an inert gas such as nitrogen or argon.

When a light transmission layer is formed by irradiating an ultraviolet light or an electron beam a resin composition coated on an information layer in an atmosphere depleted of oxygen such as at an oxygen level of 1,000 ppm or less, the crosslinking density of the surface of the light transmission layer can be improved while enabling a localization of the components contained in the resin composition, such as a lubricant, near the surface of the light transmission layer, whereby improving the surface characteristics of the light transmission layer.

In such a case, it is also possible to achieve. an improvement in the water repelling ability of the light transmission layer, which serves to make it difficult to deposit any dirt on the light transmission layer, and make it easier to remove the dirt even if once deposited, whereby ensuring the prevention of any diffused reflection of a laser beam which is incident on the light transmission layer due to the dirt depositing on the surface of the light transmission layer, resulting in the capability of any desirable data recording on and readout from an optical recording medium.

In the invention, the design of an information layer is not limited particularly, and may be a recordable information layer a rewritable information layer. The information layer may be designed as a read-only memory (ROM).

In the invention, the supporting substrate preferably comprises a polycarbonate or a polyolefin.

DETAILED DESCRIPTION OF THE INVENTION

In a resin composition for forming a light transmission layer according to the invention, (A) a radical-curing urethane (meth)acrylate, which is obtained by reacting (a-1) a compound having three or more isocyanate groups binding to an aliphatic carbon atom per one molecule thereof and (a-2) a polycaprolacton-modified hydroxyethyl(meth)acrylate; and (B) a radical-curing monomer having a viscosity of 400 mPa·s or less at 25° C. are contained as main components.

Since such a resin composition has a low shrinkage upon curing by an irradiation with an ultraviolet light or an electron beam and has a high scratch resistance after curing, it enables, when used to form a light transmission layer by a spin coating method, an effective prevention of any warping of an optical recording medium at the same time with an effective prevention of any scratch on the light transmission layer, whereby enabling the recording of data on the optical recording medium as desired and the readout from the optical recording medium.

Also since this resin composition has characteristics suitable for forming a light transmission layer having a thickness of about 100 μm by a spin coating method, it eliminates the need of using a solvent for preparing a coating solution, it allows a light transmission layer having a thickness of about 100 μm to be formed on an information layer just by coating the resin composition onto an information layer by the spin coating method to form a coating film followed by irradiating an ultraviolet light or an electron beam to set the resin composition, and also allows an optical recording medium to be produced at a low cost and a high productivity because of no need for example of drying for removing the solvent.

Moreover, since a light transmission layer formed using this resin composition has a high light transmittance especially for a laser beam having a wavelength of 380 nm to 450 nm employed in a next generation optical recording medium, this resin composition is suitable for forming the light transmission layer of the next generation optical recording medium.

Also since this resin composition has a low shrinkage upon curing, an optical recording medium whose light transmission layer is formed using this resin composition undergoes less warping and the light transmission layer formed using this resin composition has a high scratch resistance. As a result, a scratch on the light transmission layer can be prevented even if the optical recording medium is brought into contact with a pickup, and accordingly this resin composition is suitable especially for forming a light transmission layer in a next generation optical recording medium.

In the invention, (A) a radical-curing urethane (meth)acrylate is obtained by reacting (a-1) a compound having three or more isocyanate groups binding to an aliphatic carbon atom per one molecule thereof and (a-2) a polycaprolacton-modified hydroxyethyl(meth)acrylate.

In the invention, (a-1) a compound having three or more isocyanate groups binding to an aliphatic carbon atom per one molecule thereof may be a monomer, oligomer or polymer. In the invention, a monomer is a compound serving as a unit for constructing a polymer and also is a compound whose molecular weight is less than 2,000, an oligomer means a polymer formed by binding several to several ten monomers which is a compound whose molecular weight is 2,000 to 10,000, and a polymer means a polymer formed by binding more than several ten monomers which is a compound whose molecular weight is exceeding 10,000.

When an isocyanate group contained in the compound (a-1) is bound to an aliphatic carbon atom, the light transmittance of a light transmission layer for a laser beam having a wavelength of 380 nm to 450 nm is elevated, resulting in a preferable capability of keeping the light transmittance of the light transmission layer at a sufficiently high level even after storing an optical recording medium for a prolonged period.

The compound (a-1) can be obtained for example by modifying a diisocyanate compound having two isocyanate groups binding to an aliphatic carbon atom in its molecule. A method for modifying the diisocyanate compound is not limited particularly, and may for example be an isocyanurate modification, trimethyrol propane (TMP) modification and biuret modification.

Examples of the diisocyanate compound having two isocyanate groups binding to an aliphatic carbon atom in its molecule employed for obtaining the compound (a-1) includes isophorone diisocyanate, xylylene diisocyanate, hexamethylene diisocyanate, dicyclohexylmethane diisocyanate, 2,2,4-trimethylhexamethylene diisocyanate, lysine diisocyanate, norbornane diisocyanate methyl.

When obtaining the compound (a-1) by subjecting a diisocyanate compound having two isocyanate groups binding to an aliphatic carbon atom in its molecule to an isocyanurate modification, the compound (a-1) thus obtained may for example be a compound represented by the following Formula (6).

(6)

In the above Formula (6), Examples of R include the following formulas.

When obtaining the compound (a-1) by subjecting a diisocyanate compound having two isocyanate groups binding to an aliphatic carbon atom in its molecule to a TMP modification, the compound (a-1) thus obtained may for example be a compound represented by Formula (7) shown below.

(7)

R in Formula (7) is similar to R is Formula (6).

When obtaining the compound (a-1) by subjecting a diisocyanate compound having two isocyanate groups binding to an aliphatic carbon atom in its molecule to a biuret modification, the compound (a-1) thus obtained may for example be a compound represented by Formula (8) shown below.

(8)

The modification method of the isocyanurate modification, trimethylolpropane (TMP) modification and biuret modification may employ any ordinary procedures and conditions.

On the other hand, (a-2) a polycaprolacton-modified hydroxyethyl(meth)acrylate is reactive with the compound (a-1) and has a $CH_2=C(R)$ group (in which R is a hydrogen atom or a methyl group) capable of being polymerized by an ultraviolet light or an electron beam irradiation. When using this compound to prepare the (meth)acrylate (A), the characteristics of this (meth)acrylate (A) which are required for forming a light transmission layer having a thickness of about 100 μm by a spin coating method enables, without the need of using a solvent, the formation of a light transmission layer having a high light transmittance for a laser beam having a wavelength of 380 nm to 450 nm by coating the resin composition onto an information layer by the spin coating method to form a coating film followed by irradiating an ultraviolet light or an electron beam to cure the resin composition. Also when adding an additive such as a polymerization initiator or lubricant, the characteristics required for a spin coating method can be kept, thus enabling the formation of a light transmission layer having high light transmittance and surface characteristics.

Example of a polycaprolacton-modified hydroxyethyl (meth)acrylate (a-2) includes a compound represented by Formula (9) shown below.

(9)

R in a compound represented by Formula (9) represents a hydrogen atom or a methyl group.

In FIG. 9, n represents an integer of 1 to 25. It is preferable that n is an integer of 1 to 5. When n in a compound represented by Formula (9) is an integer of 1 to 5, the resin composition has a high curing performance, and the scratch resistance of a light transmission layer formed from the resin composition can further be improved.

While the mixing ratio when reacting the compound (a-1) with the (meth)acrylate (a-2) for obtaining the (meth)acrylate (A) is not limited particularly, it is preferred that 10 to 60 parts by weight of the compound (a-1) is mixed and reacted with 40 to 90 parts by weight of the (meth)acrylate (a-2).

The compound (a-1) and the (meth)acrylate (a-2) can be reacted in a solution, and the examples of the solution inslude an aromatic hydrocarbon-based solvent such as toluene and xylene; a ketone-based solvent such as acetone, methyl ethyl ketone, methyl isobutyl ketone and cyclohexanone; an ester-based solvent such as ethyl acetate, propyl acetate, isobutyl acetate and butyl acetate.

Upon reacting the compound (a-1) with the (meth)acrylate (a-2), a compound having a radical-reactive group other than the compound (a-1) and the (meth)acrylate (a-2) (hereinafter referred to as a radically reactive diluent) can be employed instead of a solvent. Examples of the radically reactive diluent include styrene, isobornyl acrylate, acryloyl morphorin, diethylene glycol diacrylate and triethylene glycol diacrylate.

These solvents and radically reactive diluents may be employed alone or in combination of two or more.

It is also possible to effect a reaction in a system consisting only of the compound (a-1) and the (meth)acrylate (a-2) without using the solvents and radically reactive diluents mentioned above.

The compound (a-1) and the (meth)acrylate (a-2), in each case mentioned above, are reacted preferably at a temperature from ambient temperature (about 20° C.) to 100° C. for a period of 1 hour to 10 hours.

Upon reacting the compound (a-1) with the (meth)acrylate (a-2), a catalyst can be employed if necessary, and examples thereof include dibutyltin dilaurate, dibutyltin ethylhexoate and dibutyltin sulfite. The amount of a catalyst to be added is preferably 0.01 to 1 parts by weight, more preferably 0.02 to 0.5 parts by weight per 100 parts by weight of the total of the compound (a-1) and the (meth)acrylate (a-2).

A polymerization inhibitor can also be employed if necessary upon reacting the compound (a-1) with the (meth)acrylate (a-2), and examples thereof include hydroquinone monomethyl ether. The amount of a polymerization inhibitor to be added is preferably $1.0 \times 10^{-5}$ to 1 parts by weight per 100 parts by weight of the total of the compound (a-1) and the (meth)acrylate (a-2).

The radical-curing monomer (B), which has a viscosity of 400 mPa·s or less at 25° C., contained in a resin composition employed for forming a light transmission layer is not limited particularly as long as it is a monomer copolymerizable with the (meth)acrylate (A), has a radical-reactive group and has a viscosity at 25° C. of 400 mPa·s or less.

While a radical-reactive group in the invention is not limited particularly, examples thereof include $CH_2=C(R)$— group (in which R is a hydrogen atom or a methyl group). It is preferable that the radical-reactive group is a (meth)acryloyl group $CH_2=C(R)$—COO— group (in which R is a hydrogen atom or a methyl group).

The radical-curing monomer (B) may be a monofunctional monomer having one radical-reactive group in its molecule or a multifunctional monomer having two or more radical-reactive groups in its molecule.

When using the radical-curing monomer (B), the characteristics of this radical-curing monomer (B) which are required for forming a light transmission layer having a thickness of about 100 μm by a spin coating method enables, without the need of using a solvent, the formation of a light transmission layer having a high light transmittance for a laser beam having a wavelength of 380 nm to 450 nm only by coating the resin composition onto an information layer by the spin coating method to form a coating film followed by irradiating an ultraviolet light or an electron beam to set the resin composition. Also when adding an additive such as a polymerization initiator or lubricant, the characteristics required for a spin coating method can be kept, thus enabling the formation of a light transmission layer having high light transmittance and surface characteristics.

In order to impart the characteristics which are required for forming a light transmission layer having a thickness of about 100 μm by a spin coating method to the radical-curing monomer (B), it is required that the radical-curing monomer (B) has a viscosity at 25° C. of 400 mPa·s or less. The viscosity of the radical-curing monomer (B) at 25° C. is more preferably 250 mPa·s or less. Its lower limit is not limited particularly but is preferably 1 mPa·s.

Examples of the radical-curing monomer (B) include isoamyl acrylate (viscosity of 1 to 2 mPa·s), lauryl acrylate (viscosity of 4 to 5 mPa·s), stearyl acrylate (viscosity of 8 to 10 mPa·s), butoxyethyl acrylate (viscosity of 3 to 4 mPa·s), ethoxydiethylene glycol acrylate (viscosity of 4 to 5 mPa·s), methoxytriethylene glycol acrylate (viscosity of 5 to 6 mPa·s), methoxypolyethylene glycol acrylate (viscosity of 25 mPa·s), phenoxyethyl acrylate (viscosity of 10 to 15 mPa·s), tetrahydrofurfuryl acrylate (viscosity of 4 to 5 mPa·s), isoborynyl acrylate (viscosity of 5 to 10 mPa·s), 2-hydroxyethyl acrylate (viscosity of 4 to 5 mPa·s), 2-hydroxypropyl acrylate (viscosity of 5 to 6 mPa·s), triethylene glycol diacrylate (viscosity of 9 to 11 mPa·s), neopentyl glycol diacrylate (viscosity of 5 to 6 mPa·s), 6-hexanediol diacrylate (viscosity of 5 to 6 mPa·s), trimethyrolpropane triacrylate (viscosity of 80 to 120 mPa·s), hydroxidipivalic acid neopentyl glycol diacryrate (viscosity of 10 to 30 mPa·s), 2-(2'-vinyloxyethoxy)ethyl acrylate (viscosity of 3 to 4 mPa·s), 2-(2'-vinyloxyethoxy)ethyl methacrylate (viscosity of 3 to 4 mPa·s), 2,2,3,3-tetrafluoropropyl acrylate (viscosity of 2 mPa·s), 1H,1H,5H-octafluoropentyl acrylate (viscosity of 3 mPa·s), N-vinylformamide (viscosity of 4 mPa·s), N-vinylpyrrolidone (viscosity of 2 mPa·s), acryloylmorpholine (viscosity of 12 mPa·s), N,N-dimethylacrylamide (viscosity of 1 to 2 mPa·s), N,N-diethylacrylamide (viscosity of 2 mPa·s), triallylcyanurate (viscosity of 10 to 20 mPa·s at 30° C.) and triallylisocyanurate (viscosity of 80 to 110 mPa·s at 30° C.).

The mixing ratio of the (meth)acrylate (A) and the radical-curing monomer (B) in a resin composition forming a light transmission layer is not limited particularly, and it is preferable to prepare the resin composition by mixing 40 to 95 parts by weight of the (meth)acrylate (A) and 5 to 60 parts by weight of the radical-curing monomer (B).

A resin composition prepared by mixing the (meth)acrylate (A) and the radical-curing monomer (B) in a ratio specified above has characteristics suitable for a spin coating method, and accordingly is capable of forming a desirable light transmission layer by the spin coating method. It is more preferable to prepare the resin composition by mixing 60 to 90 parts by weight of the (meth)acrylate (A) and 10 to 40 parts by weight of the radical-curing monomer (B).

In the invention, for the purpose of forming a light transmission layer having excellent scratch resistance and light transmissibility and also of producing an optical recording medium undergoing a reduced warping at a low cost and a high productivity, a resin composition for forming the light transmission layer is required to contain, as main components, the (meth)acrylate (A) and the radical-curing monomer (B).

It is preferred to prepare a resin composition for forming a light transmission layer without using a solvent, and the resin composition preferably contains substantially no solvent.

When using a resin composition containing a solvent upon forming a light transmission layer having a thickness of about 100 μm by a spin coating methods a need of solvent drying processes may arise, resulting in a possibility of reducing the productivity of an optical recording medium. Even if the solvent drying processes are conducted, it is difficult to remove the solvent completely from the deep region of the coating film as thick as 100 μm and an adverse effect on the light transmission layer such as blistering the light transmission layer or an uneven coating on the surface of the transmission layer may arise.

When a resin composition contains substantially no solvent, a light transmission layer can be formed just by coating the resin composition onto an information layer by the spin coating method to form a coating film followed by irradiating an ultraviolet light or an electron beam to set the resin composition, and an optical recording medium becomes capable to be produced at a low cost and a high productivity.

When irradiating a resin composition for forming a light transmission layer with an ultraviolet light or an electron beam to effect curing, the resin composition preferably contains (C) a photopolymerization initiator. On the other hand, the resin may not contain the phopolymerization initiator (C) when being set by an irradiation with an electron beam.

In the invention, the photopolymerization initiator (C) is preferably an acetophenone-based photopolymerization initiator represented by Formula (1) and/or a benzophenone-based photopolymerization initiator represented by Formula (2), and which contains no compound having a thioxanthone skeleton represented by Formula (3), phosphine oxide skeleton represented by Formula (4) or titanocene skeleton represented by Formula (5).

A light transmission layer formed from a resin composition containing such a photopolymerization initiator has a high light transmittance for a laser beam at 380 nm to 450 nm.

Examples of the photopolymerization initiator (C) include isopropylbenzoin ether, isobutylbenzoin ether, 2,2-dimethoxy-1,2-diphenylethane-1-on (such as a product of Ciba-geigy under the trade name "IRGACURE 651 (IRG651)"), benzophenone, acetophenone, 1-hydroxycyclohexyl phenyl ketone (such as a product of Ciba-geigy under the trade name "IRGACURE 184 (IRG184)"), 2-hydroxy-2-methyl-1-phenyl-propan-1-one (such as a product of Ciba-geigy under the trade name "DAROCURE 1123"), o-benzoylmethyl benzoate, 2-methyl-1-[4-(methylthio)phenyl]-2-morpholinopropan-1-one (such as a product of Ciba-geigy under the trade name "IRGACURE 907 (IRG907)"), 1-[4-(2-hydroxyethoxy)phenyl]-2-hydroxy-2-methyl-1-propan-1-one (such as a product of Ciba-geigy under the trade name "IRGACURE 2959 (IRG2959)"), p-dimethylamino benzoic acid isoamyl ester, p-dimethylaminobenzoic acid ethyl ester and methylbenzyl formate. Among those listed above, acetophenone, 1-hydroxycyclohexyl phenyl ketone, 2-hydroxy-2-methyl-l-phenyl-propan-1-one, o-benzoylmethyl benzoate, 2-methyl-1-[4-(methylthio)phenyl]-2-morpholinopropan-1-one, 1-[4-(2-hydroxyethoxy)phenyl]-2-hydroxy-2-methyl-1-propan-1-one are employed preferably as the photopolymerization initiators (C).

The photopolymerization initiator (C) may be employed alone or in combination of two or more.

While the amount of the photopolymerization initiator (C) to be added is not limited particularly, it is preferable that a resin composition contains 1 to 5% by weight of the photopolymerization initiator (C).

A resin composition for forming a light transmission layer preferably contains 0.1 to 5% by weight of (D) a lubricant, which is at least one selected from a group consisting of a fatty acid ester-based lubricant, a silicone-based lubricant and a fluorine compound-based lubricant. When the resin composition for forming the light transmission layer contains at least one lubricant (D) selected from the group consisting of a fatty acid ester-based lubricant, a silicone-based lubricant and a fluorine compound-based lubricant, the lubricity of the light transmission layer surface can further be improved, and accordingly, when subjecting data to recording on and readout from a next generation optical recording medium a scratch on the surface of the light transmission layer of the optical recording medium can effectively be prevented even if the surface of the optical recording medium is brought into contact with a pickup.

Examples of the fatty acid ester-based lubricant include 2-hexyldecyl isostearate, 2-hexyldecyl myristate, 2-hexyldecyl stearate, 2-ethylhexyl palmitate, isopropyl isostearate, isopropyl myristate, myristyl myristate, cetyl palmitate, 2-octyldodecyl myristate, 2-ethylheyl stearate, cholesteryl stearate and phytosteryl isostearate.

Examples of the silicone-based lubricant include a polyalkylene oxide-modified silicone (such as dimethylsiloxane-ethyleneoxide block copolymer (a product of Gelest Incorporated, USA under the trade name of "DBE-224, DBE-621, DBE-712, DBE-814, DBE-821"), dimethylsiloxane (60% propylene oxide 40% ethylene oxide) (a product of Gelest Incorporated, USA under the trade name of "DBE-732, DBE-534"), dimethylsiloxane-alkylene oxide block copolymer (a product of Shin-Etsu Chemical Co., Ltd under the trade name of "KF-6011, KF-6012, KF-6013, KF-6015, KF-6016, KF-6017", a product of Nihon Unica under the trade name of "L-7011, L-7604, FZ-2105, FZ-2118, FZ-2161") and amino-modified silicone (such as a product of Shin-Etsu Chemical Co., Ltd under the trade name of "KF-410").

Examples to other silicone-based lubricant include a polydimethylsiloxane having a hydroxy group at a terminal, namely and carbinol silicone (a product of Gelest Incorporated, USA under the trade name of "DMS-C15, DMS-C21, DME-C25, DBL-C31, DBP-C22").

Examples of the fluorine compound-based lubricant include perfluorohexanoic acid, perfluoroheptanoic acid, perfluorooctanoic acid, perfluorononanoic acid, perfluorodecanoic acid, perfluorogurtalic acid, perfluoroadipic acid, perfluorosuberic acid, perfluoroazelaic acid, perfluorosebacic acid, perfluorolauric acid and a derivative thereof, 1H,1H-perfluoro-n-octyl acrylate, 1H,1H-perfluoro-n-decyl acrylate, 1H,1H,6H,6H-perfluoro-1,6-hexanediol diacrylate, 1H,1H,6H,6H-perfluoro-1,6-hexanediol dimethacrylate, 1H,1H-perfluoro-1-octanol, 1H,1H-perfluoro-1-nonanol, 1H,1H-perfluoro-1-decanol, 1H,1H,4H,4H-perfluoro-1,4-butanediol, 1H,1H,5H,5H-perfluoro-1,5-pentanediol, 1H,1H,6H,6H-perfluoro-1,6-hexanediol, 1H,1H,8H,8H-perfluoro-1,8-octanediol, 1H,1H,9H,9H-perfluoro-1,9-nonanediol, 1H,1H,10H,10H-perfluoro-1,10-decanediol, 1H,1H,12H,12H-perfluoro-1,12-dodecanediol and a derivative thereof, perfluoro-3,6-dioxaheptanoic acid, perfluoro-3,6,9-trioxadecanoic acid, perfluoro-3,6-dioxadecanoic acid, perfluoro-3,6-9-trioxatridecanoic acid, perfluoro-3,6-dioxaoctane-1,8-dicarboxylic acid, perfluoro-3,6,9-trioxaundecane-1,11-dicarboxylic acid and a derivative thereof, perfluoro-3,6-dioxaheptanol, perfluoro-3,6,9-trioxadecanol, perfluoro-3,6-dioxadecanol, perfluoro-3,6,9-trioxatridecanol, perfluoro-3,6-dioxaoctane-1,8-diol, perfluoro-3,6,9-trioxaundecane-1,11-diol and a derivative thereof, perfluoropolyether acrylate (a product of Kyoeisha under the trade name of "ART-3, ART-4") and urethane acrylate-modified perfluoropolyether (prototype).

The lubricant (D) preferably contains at least one radical-reactive group per molecule and preferably has a molecular weight of 10,000 or less. A molecular weight of the lubricant (D) of 10,000 or less serves to ensure a mobility of the lubricant (D) in a resin composition for forming a light transmission layer which allows the lubricant (D) to readily be localized near the surface of a light transmission layer, while the possession of at least one radical-reactive group by the lubricant (D) in the molecule serves to allow the lubricant (D) localized near the surface of a light transmission layer to react with the (meth)acrylate (A) and the radical-curing monomer (B) whereby accomplishing immobilization near the surface of the light transmission layer, resulting in a further improvement in the lubricity of the surface of the light transmission layer.

While the radical-reactive group contained in the lubricant (D) is not limited particularly, it is preferable that the radical-reactive group is $CH_2=C(R)-$ group (in which R is a hydrogen atom or a methyl group), more preferably a (meth)acrylate group of $CH_2=C(R)-COO-$ group (in which R is a hydrogen atom or a methyl group).

Any of these lubricants (D) may be employed alone or in combination of two or more.

While the amount of the lubricant (D) is not limited particularly, it is preferred that 0.01% to 5% by weight of the lubricant (D) is contained in a resin composition.

A resin composition for forming a light transmission layer may further contain additives such as a leveling agent, surfactant, antistatic agent and polymerization inhibitor.

A resin composition for forming a light transmission layer is prepared by mixing the (meth)acrylate (A) and the radical-curing monomer (B) if necessary together with the photopolymerization initiator (C), the lubricant (D) and other additives at ambient temperature (about 20° C.) to 100° C. until uniform.

Preferred embodiments of the invention are further detailed below with referring to Figures.

Figure 1:
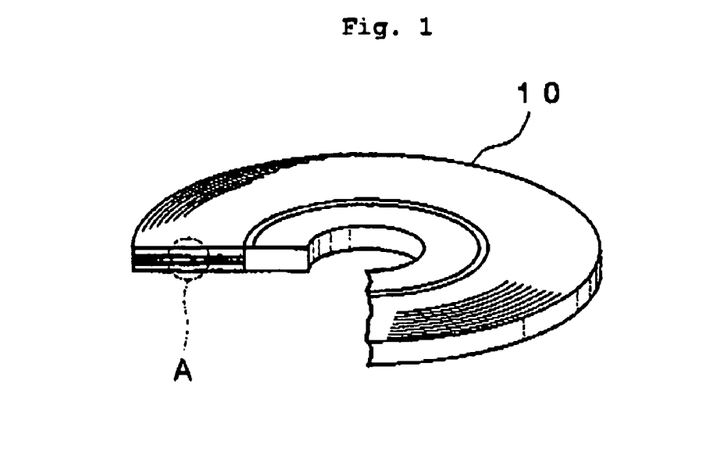
FIG. 1 shows a partially broken schematic perspective view of an optical recording medium produced by a method for producing an optical recording medium according to a preferred embodiment of the invention.
Figure 2:
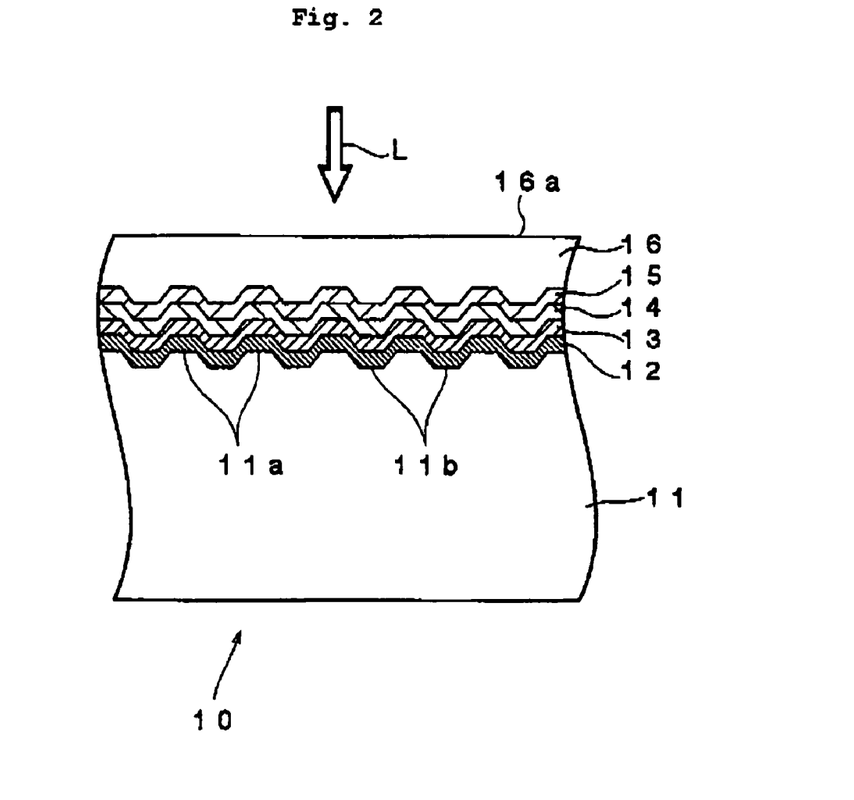
FIG. 2 shows a magnified schematic sectional view of the part designated by A.

FIG. 1 shows a partially broken schematic perspective view of an optical recording medium produced by a method for producing an optical recording medium according to a preferred embodiment of the invention, and FIG. 2 shows a magnified schematic sectional view of the part designated by A.

As shown in FIGS. 1 and 2, an optical recording medium 10 produced by a method for producing an optical recording medium according to a preferred embodiment of the invention is formed as a disc, and has an outer diameter of about 120 mm and a thickness of about 1.2 mm.

The optical recording medium 10 produced by a method for producing an optical recording medium according to this embodiment is designed so that a laser beam L whose wavelength is 380 nm to 450 nm is irradiated to the optical recording medium 10 in the direction designated by an arrow in FIG. 2.

The optical recording medium 10 produced by a method for producing an optical recording medium according to a preferred embodiment of the invention is designed as a rewritable optical recording medium, and as shown in FIG. 2, provided with a supporting substrate 11, a reflection layer 12 formed on the surface of the supporting substrate 11, a second dielectric layer 13 formed on the surface of the reflection layer 12, a recoding layer 14 formed on the surface of the second dielectric layer 13, a first dielectric layer 15 formed on the surface of the recording layer 14, and a light transmission layer 16 formed on the surface of the first dielectric layer 15. In this embodiment, the reflection film 12, the second dielectric layer 13, the recording layer 14 and the first dielectric layer 15 constitute an information layer.

In this embodiment, as shown in FIG. 2, a light incident surface 16a is constituted by the surface of the light transmission layer 16, and the light incident surface 16a is irradiated with a laser beam having a wavelength of 380 nm to 450 nm, whereby recording data on the optical recording medium 10, and from the optical recording medium 10 the data are read.

The support substrate 11 serves as a support for ensuring a mechanical strength which needs to be possessed by the optical recording medium 10. A material for forming the support substrate 11 is not limited particularly as long as it can act as a support for the optical recording medium 10. The support substrate 11 can be formed for example from glass, ceramic, resin and the like. Among these, a resin is employed preferably in view of the moldability. Examples of the resin include a polycarbonate resin, polyolefin resin, acrylic resin, epoxy resin, polystyrene resin, ABS resin, urethane resin and polyetherimide resin. Among these, a polycarbonate resin and a polyolefin resin are preferred especially in view of processability, optical characteristics and the like. In an optical recording medium produced by a method for producing an optical recording medium according to this embodiment, the support substrate 11 is formed from a polycarbonate resin.

Since a laser beam is irradiated via the light transmission layer 16 located opposite to the support substrate 11 in the invention, the support substrate 11 may not have a light transmissibility.

In the invention, on the surface of the support substrate 11, a groove 11a and a land 11b are formed alternatively in a form of a spiral or a concentric circle in the direction from the center proximity to the circumference or from the circumference to the center proximity.

The groove 11a and/or the land 11b formed on the surface of the support substrate 11 serves as a guide track for the laser beam. While the depth of the groove is not limited particularly, it is preferably $\lambda/(8n)$ to $\lambda/(4n)$ (in which n is a refractive index of the light transmission layer 16), and the pitch of the groove 11a is preferably 0.2 to 0.4 μm although it is not limited particularly.

As shown in FIG. 2, the reflection layer 12 is formed on the surface of the support substrate 11, and the reflection layer 12 serves to reflect the incident laser beam L via the light transmission layer 16 and enable the re-emission from the light transmission layer 16, and also serves to increase the regeneration signal (C/N ratio) by means of a multiple interference effect.

A material for forming the reflection layer 12 is not limited particularly as long as it can reflect the laser beam L, and the reflection layer 12 can be formed for example from Al, Cr, Fe, Co, Ni, Cu, Ag, Au and the like. Among these, Al, Au, Ag, Cu having a high refractory index or an alloy containing at least one of these metals such as an alloy of Ag with Cu are employed preferably for forming the reflection layer 12.

While the thickness of reflection layer 12 is not limited particularly, it is preferably 5 to 300 nm.

As shown in FIG. 2, the second dielectric layer 13 is formed on the surface of the reflection layer 12, and the second dielectric layer 13 serves, together with the first dielectric layer 15 formed on the recording layer 14, to protect the recording layer 14 chemically and mechanically while adjusting the optical characteristics.

The second dielectric layer 13 is formed preferably from an oxide, a nitride, a sulfide or a carbide containing at least one metal selected from the group consisting of Si, Zn, Al, Ta, Ti, Co, Zr, Pb, Ag, Zn, Sn, Ce, V, Cu and Mg, or a complex thereof.

While the thickness of the second dielectric layer 13 is not limited particularly, it is preferably 3 to 200 nm.

As shown in FIG. 2, on the surface of the second dielectric layer 13, the recoding layer 14 is formed, and the recording layer 14 is a layer on which a recording mark is formed and data are recorded.

The recording layer 14 is formed from a phase change film, and SbTe-based material may for example be contained.

While the thickness of the recording layer 14 is not limited particularly, it is preferably 3 to 50 nm, more preferably 5 to 40 nm.

As shown in FIG. 2, on the surface of the recoding layer 14, the first dielectric layer 15 is formed. The first dielectric layer 15 serves, together with the second dielectric layer 13, to protect the recording layer 14 chemically and mechanically while adjusting the optical characteristics.

The first dielectric layer 15 is formed preferably from an oxide, a nitride, a sulfide or a carbide containing at least one metal selected from the group consisting of Si, Zn, Al, Ta, Ti, Co, Zr, Pb, Ag, Zn, Sn, Ce, V, Cu and Mg, or a complex thereof While the thickness of the first dielectric layer 15 is not limited particularly, it is preferably 3 to 200 nm.

The first dielectric layer 15 and the second dielectric layer 13 may be formed from same or different dielectric materials. It is also possible that at least one of the first dielectric layer 15 and the second dielectric layer 13 is in a form of a multilayer structure consisting of multiple dielectric films.

As shown in FIG. 2, on the surface of the first dielectric layer 15, the light transmission layer 16 is formed.

The light transmission layer 16 is a layer through which a laser beam transmits and preferably has a thickness of 10 to 300 µm, and more preferably the light transmission layer 16 has a thickness of 50 to 150 µm. An optical recording medium produced by a method for producing an optical recording medium according this embodiment has a thickness of 100 µm.

According to this embodiment, the optical recording medium 10 constructed as described above is produced by the following procedure.

First, a stumper is employed to form a support substrate 11 having a groove 11a and a land 11b on the surface by means of an injection molding.

Then, on the surface of the substrate 11 on which the groove 11a and the land 11b have been formed, a reflection layer 12 is formed. The reflection layer 12 can be formed for example by a vapor growth using chemical species containing the constituent elements of the reflection layer 12. Such a vapor growth may for example be a vacuum deposition method, spattering method and the like.

Then, on the surface of the reflection layer 12, a second dielectric layer 13 is formed. The second dielectric layer 13 can be formed for example by a vapor growth using chemical species containing the constituent elements of the second dielectric layer 13. Such a vapor growth may for example be a vacuum deposition method, spattering method and the like.

Furthermore, on the surface of the second dielectric layer 13, a recording layer 14 is formed. The recording layer 14 can also be formed by a vapor growth using chemical species containing the constituent elements of the recording layer 14 similarly to the second dielectric layer 13.

Then, on the surface of the recording layer 14, a first dielectric layer 15 is formed. The first dielectric layer 15 can also be formed by a vapor growth using chemical species containing the constituent elements of the first dielectric layer 15.

As described above, an information layer is formed on the surface of the support substrate 11.

Finally, on the surface of the first dielectric layer 15, a light transmission layer 16 is formed.

For forming the light transmission layer 16, a resin composition containing as main components the (meth)acrylate (A) and the radical-curing monomer (B) is prepared.

Then, the support substrate 11 on whose surface an information layer is formed is set on a stage (not shown) in a spin coating device (not shown).

Then, by a stage rotating mechanism (not shown) a stage is rotated at a rate for example of 10 to 1,000 rpm.

Then, onto the center of the first dielectric layer 15 formed on the support substrate 11 the resin composition prepared as described above is poured. Almost at the same time with or immediately after the completion of the pouring of a certain amount of the resin composition, the rotation speed of the stage is increased to a certain speed, such as 1000 to 8000 rpm.

As a result, the resin composition poured onto the center of the first dielectric layer 15 spreads toward the circumference of the support substrate 11 over the surface of the first dielectric layer 15 by an eccentric force resulting from the rotation of the stage, whereby forming a coating film of the resin composition on the surface of the first dielectric layer 15.

In this embodiment, since the resin composition has characteristics suitable for being coated by a spin coating method, the coating film of the resin composition can be formed as desired on the surface of the first dielectric layer 15.

Then, the stage rotating mechanism is inactivated, and the support substrate having the resin composition coating film formed on the surface of the first dielectric layer 15 is taken out of the spin coating method.

Then in the air at a temperature from ambient temperature (25° C.) to about 100° C., the resin composition coating film is irradiated with an ultraviolet light so that the cumulative dose is about 500 to 5000 mJ/cm$^2$, or with an electron beam so that the absorption dose is about 20 kGy to 100 kGy at an acceleration voltage of about 30 keV to 200 keV to set the resin composition, whereby forming the light transmission layer 16.

EXAMPLES

The present invention is now illustrated in greater detail with reference to Examples, but it should be understood that the present invention is not to be construed as being limited thereto.

Example 1

An optical recording medium sample No. 1 was prepared as described below.

First, an injection molding method was employed to prepare a polycarbonate substrate in a disk form whose thickness was 1.2 mm and whose outer diameter was 120 mm.

Subsequently, a 500 ml volume fitted with a stirrer, thermometer and condenser was charged with 50 parts by weight of an isocyanurate-modified hexamethylene diisocyanate (a product of MITSUI TAKEDA CHEMICAL under the trade name "TAKENATE D-170N", 100% active ingredient, isocyanate group content:20.9% by weight), 58 parts by weight of a polycaprolacton—modified hydroxyethyl acrylate (a product of DAICEL KAGAKU KOGYO under the trade name "PLACSEL FA2D", mean molecular weight=344), 108 parts by weight of toluene as a solvent, 0.02 parts by weight of dibutyltin laurate as a catalyst and 0.2 parts by weight of hydroquinone monomethyl ether, and the mixture was heated at 70° C.

The mixture was further reacted with stirring for 3 hours at 70° C., and then toluene was distilled off thoroughly under reduced pressure to obtain (A) a radical-curing urethane (meth)acrylate containing 100% involatiles.

The radical-curing urethane(meth)acrylate (A) thus obtained was employed to prepare a resin composition having the following composition.

85 parts by weight of radical-cure urethane(meth)acrylate (A);

15 parts by weight of N-Vinylformaldehyde (radical-cure monomer (B)) (a product of ARAKAWA KAGAKU, viscosiy at 25° C.: 4 mPa·s);

4 parts by weight of 1-Hydroxycylohexyl phenyl ketone (photopolymerization initiator (C)) (a product of Ciba-geigy under the trade name "IRG184"); and 0.5 parts by weight of polyalkylene oxide-modified silicone (lubricant (D))(a product of Shin-Etsu Chemical Co., Ltd under the trade name "KF-6012", dynamic viscosity; 1600 $mm^2$/s, HLB value: 7.0).

Then, the polycarbonate substrate thus obtained was set on the stage of a spin coating device, fixed and the stage rotating mechanism is actuated to rotate the stage at 30 rpm.

Then, 4 g of the resin composition thus prepared was poured onto the center of the polycarbonate substrate, and the stage was rotated at 2,000 rpm while coating the resin composition onto the polycarbonate substrate so that the thickness after the curing became 100 μm whereby forming a coating film.

The coating film thus obtained was irradiated in the air at 25° C. with the ultraviolet light so that the cumulative dose became about 1500 $mJ/cm^2$ to set the coating film to form a light transmission layer whose thickness was 100 μm.

Thus, the optical recording medium sample No. 1 was prepared.

An optical recording medium sample No. 2 was also prepared similarly to the optical recording medium sample No. 1 except for preparing a resin composition using as a radical-cure monomer (B) a tetrahydrofurfuryl acrylate (a product of WAKO PURE CHEMICAL, viscosity at 25° C.: 4 to 5 mPa·s) instead of N-vinylformamide and using as a lubricant (D) a polycaprolacton-silicone-polycaprolacton block copolymer (a product of Gelest Incorporated, USA under the trade name "DBL-C31", weight mean molecular weight: 5,700 to 6,900, silicone unit content: 50% by mole) instead of the polyalkylene oxide-modified silicone.

Then, an optical recording medium sample No. 3 was also prepared similarly to the optical recording medium sample No. 1 except for preparing a resin composition using as a radical-cure monomer (B) a 1H,1H,5H-octafluoropentyl acrylate (a product of OSAKA YUKI KAGAKU KOGYO under the trade name "BISCOTE 8F", viscosity at 25° C.: 3 mPa·s) instead of N-vinylformamide and using as a lubricant (D) an urethane acrylate-modified perfluoropolyether having the structure shown below (prototype, weight mean molecular weight: about 1,000) instead of the polyalkylene oxide-modified silicone.

An optical recording medium sample No. 4 was also produced similarly to the optical recording medium sample No. 3 except for irradiating the coating film in the air at 25° C. with the ultraviolet light so that the cumulative dose became about 100 $mJ/cm^2$, followed by irradiating the coating film in an atmosphere depleted of oxygen of the oxygen concentration of 80 ppm at 25° C. with the ultraviolet light so that the cumulative dose became about 1,500 $mJ/cm^2$ to set the coating film, instead of irradiating the coating film with the ultraviolet light so that the cumulative dose became about 1,500 $mJ/cm^2$ Then, a comparative optical recording medium sample No. 1 was produced similarly to the optical recording medium sample No. 1 except for using the resin composition having the following composition to form a light transmission layer.

50 Parts by weight of urethane acrylate oligomer (1) (a product of MITSUBISHI RAYON under the trade name "DIA-BEAM UK-6074";

30 Parts by weight of urethane acrylate oligomer (2) (a product of MITSUBISHI RAYON under the trade name "DIA-BEAM UK-6098":

10 Parts by weight of tetrahydrofurfuryl acrylate (a product of WAKO PURE CHEMICAL);

10 Parts by weight of triallyl isocyanurate (a product of NIPPON KASEI under the trade name "TAIC");

4 Parts by weight of 1-Hydroxycyclohexyl phenyl ketone (a product of Ciba-geigy under the trade name "IRG184"); and 0.9 parts by weight of polyalkylene oxide-modified silicone (a product of Shin-Etsu Chemical Co., Ltd under the trade name "KF-6012", dynamic viscosity: 1600 $m^2$/s, HLB value: 7.0).

Furthermore, a comparative optical recording medium sample No. 2 was produced similarly to the optical recording medium sample No. 1 except for using the resin composition having the following composition to form a light transmission layer.

50 Parts by weight of urethane acrylate oligomer (3) (a product of TOAGOSEI under the trade name "ARONIX" M-1310");

30 Parts by weight of urethane acrylate oligomer (2) (a product of Mitsubishi Rayon under the trade name "DIABEAM UK-6098";

20 Parts by weight of ethylene oxide-modified acrylate oligomer (a product of KYOEISHA KAGAKU under the trade name "LIGHTACRYLATE 14EG-A");

4 Parts by weight of 1-Hydroxycyclohexyl phenyl ketone (a product of Ciba-geigy under the trade name "IRG184"); and 0.9 parts by weight of polyalkylene oxide-modified silicone (a product of Shin-Etsu Chemical Co., Ltd under the trade name "KF-6012", dynamic viscosity: 1600 $mm^2/s$, HLB value: 7.0).

Furthermore, a comparative optical recording medium sample No. 3 was produced similarly to the optical recording medium sample No. 1 except for using the resin composition having the following composition to form a light transmission layer.

90 Parts by weight of radical-cure urethane(meth)acrylate (A) identical to one employed in optical recording medium sample No. 1;

10 Parts by weight of n-Butyl acetate (solvent);

3.6 Parts by weight of 1-Hydroxycyclohexyl phenyl ketone (a product of Ciba-geigy under the trade name "IRG184"); and 0.9 parts by weight of polyalkylene oxide-modified silicone (a product of Shin-Etsu Chemical Co., Ltd under the trade name "KF-6012", dynamic viscosity: 1600 $mm^2/s$ HLB value: 7.0).

Then, a comparative optical recording medium sample No. 4 was produced similarly to the optical recording medium sample No. 1 except for using trimethylol propane-mofidied tolylene diisocyanate (isocyanate group bound to an aromatic carbon atom, a product of NIPPON POLYURETHANE under the trade name "COLONATE L") instead of isocyanurate-modified hexamethylene diisocyanate (isocyanate group bound to an alyphatic carbon atom) to form an ultraviolet light curing urethane(meth)acrylate.

Then, a comparative optical recording medium sample No. 5 was produced similarly to the optical recording medium sample No. 1 except for using as a radical-cure monomer (B) an ethylene oxide-modified bisphenol A acrylate oligomer (a product of KYOEISHA KAGAKU under the trade name "LIGHTACRYLATE BP-4EA", viscosity at 25° C.: about 800 mPa·s) instead of N-vinylformamide to prepare a radical-cure urethane(meth)acrylate followed by prepare a resin composition without using a lubricant (D).

The surface of the reflection layer of each of the optical recording medium samples No. 1 to No. 4 and the comparative optical recording medium samples No. 1 to 5 thus obtained was rubbed by pressing it with a steel wool (No. 000) under a pressure of a 500 $g/cm^2$ load with 20 cycles of a back-and-forth relative movement and then the surface of the light transmission layer was examined visually for the scratch resistance of the light transmission layer.

The results of the evaluation were designated as "A" when there were no scratches on the surface of the light transmission layer, as "B" when there were several scratches and as "C" when there were many scratches.

The results of the evaluation are shown in Table 1.

Example 2

Nine glass substrates each in a disc form whose thickness was 1.2 mm and whose external diameter was 120 mm were provided.

Then 9 resin compositions were prepared similarly to the preparation of the optical recording medium samples No. 1 to 4 and the comparative optical recording medium samples No. 1 to No. 5 in Example 1.

Each of the resin compositions thus prepared was coated onto the glass Substrate similarly to Example 1 to form a light transmission layer, whereby producing glass optical recording medium samples No. 1 to No. 4 for the light transmittance measurement and comparative glass optical recording medium samples No. 1 to No. 5 for the light transmittance measurement.

The light transmission layer of each of the glass optical recording medium samples No. 1 to No. 4 for the light transmittance measurement and the comparative glass optical recording medium samples No. 1 to No. 5 for the light transmittance measurement thus obtained was peeled from the glass substrate and cut into a test piece whose width was 10 mm and whose length was 50 mm, which was subjected to the measurement of the transmittance (%) of each sample's light transmission layer for the light having a wavelength of 405 nm using "V-530" (trade name) produced by JASCO.

The results are shown as initial transmittances in Table 1.

In Table 1, each sample was designated as "A" when the initial light transmittance of its light transmission layer thus measured was 85% or more, and as "C" when less than 85%.

Then, the light transmission layer of each of the glass optical recording medium samples No. 1 to No. 4 for the light transmittance measurement and the comparative glass optical recording medium samples No. 1 to No. 5 for the light transmittance measurement was irradiated continuously with a light of 20 MLux·h using XENON FADE' OMETER (Ci35A (trade name) produced by ATLAS) which was in compliance with ISO-105-B02 standard.

Then similarly to the measurement of the initial light transmittance, the light transmission layer of each sample was peeled from the glass substrate, and the transmittance '%) of the sample's light transmission layer for the light having a wavelength of 405 nm.

The results are shown as transmittances after the light resistance test in Table 1.

In Table 1, each sample was designated as "A" when the light transmittance after the light resistance test of its light transmission layer thus measured was 85% or more, and as "C" when less than 85%.

Example 3

Similarly to Example 1, optical recording medium samples No. 1 to 4 and comparative optical recording medium samples No. 1 to No. 5 were prepared, and the optical recording medium samples No. 1 to 4 and the comparative optical recording medium samples No. 1 to No. 5 were allowed to stand for 24 hours in an environment of ambient temperature (25° C.) and 50% relative humidity.

Then, each sample was set on an optical disc mechanical property evaluation device "DC-1010C" (trade name) produced by CORES and a warp angle β at a position of 58 mm from the center of each sample was measured.

The results of the measurement are shown in Table 1.

In Table 1, each of the optical recording medium samples No. 1 to 4 and the comparative optical recording medium samples No. 1 to No. 5 was designated as "A" when its warp angle β was not more than ±0.35° and as "C" when exceeding ±0.35°.

Example 4

Similarly to Example 1, optical recording medium samples No. 1 to 4 and comparative optical recording medium samples No. 1 to No. 5 were prepared, and the light transmission layer of each of the optical recording medium samples No. 1 to 4 and the comparative optical recording medium samples No. 1 to No. 5 was examined visually for bubbles in the light transmission layer and coating unevenness on the light transmission layer surface.

The results of the measurement are shown in Table 1.

In Table 1, each of the optical recording medium samples No. 1 to 4 and the comparative optical recording medium samples No. 1 to No. 5 was designated as "A" when its light transmission layer exhibited no bubbles or coating unevenness and as "C" when at least one of bubbles and coating unevenness was observed.

Example 5

Similarly to Example 1, optical recording medium samples No. 1 to 4 and comparative optical recording medium samples No. 1 to No. 5 were prepared, and the light transmission layer surface of each of the optical recording medium samples No. 1 to 4 and the comparative optical recording medium samples No. 1 to No. 5 was examined for the unwoven fabric slipperiness by rubbing the light transmission layer surface using an unwoven fabric "BENCOTTON LINT-FREE CT-8" (trade name) produced by Asahi Kasei Corporation under a pressure of a 100 g/cm² load with several back-and-forth relative movements.

The results of the measurement are shown in Table 1.

In Table 1, the most slipperiness was designated as "AA", a slipperiness as "A", a poor slipperiness as "B", and no slipperiness as "C".

Example 6

Similarly to Example 1, optical recording medium samples No. 1 to 4 and comparative optical recording medium samples No. 1 to No. 5 were prepared, and the light transmission layer surface of each of the optical recording medium samples No. 1 to 4 and the comparative optical recording medium samples No. 1 to No. 5 was subjected to a static dripping method prescribed under JIS R3257:1999 in an atmosphere of 25° C. and 50% relative humidity using a contact angle meter "CA-D" (trade name) produced by Kyowa Interface Science Co., LTD to measure the contact angle of a pure water to the surface of the light transmission layer of each of the optical recording medium samples No. 1 to 4 and the comparative optical recording medium samples No. 1 to No. 5.

The results are shown in Table 1.

In Table 1, a contact angle of the pure water to the light transmission layer surface of 100° or more was designated as "AA", 80° or more and less than 100° as "A", 60° or more and less than 80° as "B", and less than 60° as "C".

TABLE 1

|  | Optical recording medium sample | | | | Comparative optical recording medium sample | | | | |
| --- | --- | --- | --- | --- | --- | --- | --- | --- | --- |
|  | No. 1 | No. 2 | No. 3 | No. 4 | No. 1 | No. 2 | No. 3 | No. 4 | No. 5 |
| Scratch resistance | A | A | A | A | A | C | A | A | A |
| Initial light transmittance | A | A | A | A | A | A | A | A | A |
| Light transmittance after promotion of light resistance | A | A | A | A | A | C | A | C | A |
| Warping of optical recording medium | A | A | A | A | C | A | C | A | A |
| Coating state | A | A | A | A | A | A | C | A | C |
| Lubricity | AA | AA | A | A | AA | AA | AA | AA | C |
| Water-repelling performance | A | A | A | AA | A | A | A | A | C |

As evident from Table 1, in the optical recording medium samples No. 1 to No. 4, each having the light transmission layer made from the resin composition containing as main components the radical-cure urethane(meth)acrylate (A) and the radical-cure monomer (B), each of the light transmission layers were excellent in both of the initial light transmittance and the light transmittance after the light resistance test of the light transmission layer, and had excellent scratch resistance and water-repelling performance. Therefore, the resin composition thereof had the characteristics suitable for a spin coating method.

Especially in the case of the optical recording medium sample No. 4, which was irradiated twice with ultraviolet light with the second irradiation of ultraviolet light in an oxygen poor atmosphere, the crosslinking density of the resin composition surface may be improved while allowing the lubricant (D) localized near the surface of the light transmission layer to undergo a curing reaction with the (meth)acrylate (A) and the radical-cure monomer (B) whereby ensuring a firm fixation near the surface of the light transmission layer, since it was possible to prevent an inhibition of the resin composition curing due to the existence of oxygen near the surface of the coated resin composition upon curing of the resin composition by irradiating the coated resin composition with the ultraviolet light. Accordingly, the water-repelling performance of the light transmission layer surface was further improved.

On the contrary, the comparative optical recording medium sample No. 1 exhibited a substantial shrinkage upon curing of the resin composition for forming the light transmission layer which caused a warp of the optical recording medium, although it was possible to form a light transmission layer having an excellent scratch resistance.

On the other hand, the comparative optical recording medium sample No. 2 exhibited a reduced scratch resistance of the light transmission layer and a low light transmittance of the light transmission layer after the light resistance test because of the softness of the resin composition employed for forming the light transmission layer, although the resin composition employed for forming the light transmission layer exhibited a less shrinkage upon curing and no warp of the optical recording medium was observed.

Since the comparative optical recording medium sample No. 3 was not successful in forming a non-defective light transmission layer by a spin coating method since its resin composition had low viscosity because of the solvent contained in the resin composition, and also exhibited a warp of the optical recording medium.

On the contrary, the comparative optical recording medium sample No. 4 in which the ultraviolet light curing urethane (meth)acrylate (A) was prepared using a compound having in its molecule three or more isocyanate groups binding to an aliphatic carbon atom was revealed to undergo a significant reduction in the light transmittance of the light transmission layer after the light resistance test.

On the other hand, a comparative optical recording medium No. 5 whose light transmission layer was formed from the resin composition prepared using the ultraviolet light curing monomer whose viscosity at 25° C. exceeded 400 mPa·s was not possible to form an uniform resin composition by a spin coating method and exhibited an uneven coating of the light transmission layer formed as well as poor water-repelling performance and lubricity of the light transmission layer.

The invention is not limited to the embodiments described above, and may be modified within the scope of the invention specified in the claims and any modification is understood to be encompassed by the invention.

For example, while in a preferred embodiment of the invention, a resin composition is coated onto an information layer formed on a support substrate 11 by a spin coating method to form a coating film which is irradiated with an ultraviolet light to set the resin composition whereby forming a light transmission layer 16, it is also possible that a resin composition is coated onto an information layer formed on a support substrate 11 by a spin coating method to form a coating film which is irradiated with an ultraviolet light to set the resin composition only partially and then, after taking out of the spin coating device, the ultraviolet light is irradiated again to set the resin composition completely whereby forming a light transmission layer.

Moreover, while in a preferred embodiment of the invention, a resin composition is coated onto an information layer formed on a support substrate 11 by a spin coating method to form a coating film which is irradiated with an ultraviolet light in the air to set the resin composition whereby forming a light transmission layer 16, it is also possible that a resin composition is coated onto an information layer formed on a support substrate 11 by a spin coating method to form a coating film which is irradiated with an ultraviolet light in an atmosphere depleted of oxygen relative to the oxygen level of the air to set the resin composition and then whereby forming a light transmission layer 16 on the information layer.

While in a preferred embodiment of the invention a support substrate 11 is made by an injection molding using a stumper, other methods such as a 2P method may be employed to make the support substrate 11.

Moreover, while in a preferred embodiment of the invention an optical recording medium 10 is designed as a rewritable optical recording medium, the optical recording medium can be designed as a recordable optical recording medium or an optical recording medium of a read-only type (ROM).

Moreover, while in a preferred embodiment of the invention an optical recording medium 10 has a single information layer, it is not necessary that the optical recording medium 10 has a single information layer and may have two or more information layers, the designs of each of which may not be limited particularly.

Furthermore, while in a preferred embodiment of the invention an optical recording medium 10 has a support substrate 11, a second dielectric layer 13, a recording layer 14, a first dielectric layer 15 and a light transmission layer 16, it is not necessary that the optical recording medium has a support substrate 11, a second dielectric layer 13, a recording layer 14, a first dielectric layer 15 and a light transmission layer 16, and the design of the optical recording medium layers is not limited particularly as long as the information layer and the light transmission layer are provided on the support substrate. For example, other layers such as a hard coat layer may be provided on the surface of the light transmission layer. In such a case, the surface on one side of the other layer such as a hard coat layer constitutes the light incident plane on which a laser beam is incident.

A hard coat layer is preferably formed from an ultraviolet light curing compound or an electron beam curing compound and a hard coat agent composition containing an inorganic microparticle having an average particle size of 100 μm or less.

According to the invention, a method for producing an optical recording medium by which a light transmission layer which is excellent in terms of scratch resistance and light transmission property can be produced by means of a spin coating method and by which an optical recording medium whose warping can effectively be suppressed can be produced at a low cost and a high productivity is provided.

While the present invention has been described in detail and with reference to specific embodiments thereof, it will be apparent to one skilled in the art that various changes and modifications can be made therein without departing the spirit and scope thereof.

The present application is based on Japanese Patent Application No. 2004-114538 filed on Apr. 8, 2004, and the contents thereof are incorporated herein by reference.

What is claimed is:

1. A method for producing an optical recording medium, wherein the optical recording medium comprises:
   a supporting substrate;
   a light transmission layer, which transmits a laser beam; and
   an information layer formed between the supporting substrate and the light transmission layer,
   wherein the method comprises:
   applying a resin composition on the information layer by a spin coating method to form a coating film,
   wherein the resin composition comprises:
   (A) a radical-curing urethane (meth)acrylate produced by a process comprising reacting (a-1) a compound having three or more isocyanate groups binding to an aliphatic carbon atom per one molecule thereof and (a-2) a polycaprolacton-modified hydroxyethyl (meth)acrylate; and
   (B) a radical-curing monomer having a viscosity of 400 mPa·s or less at 25° C.,
   (D) 0.1-5 wt. % of at least one lubricant selected from the group consisting of a fatty acid ester-based lubricant, a silicone-based lubricant and a fluorine compound-based lubricant; and curing the coating film by irradiating the coating film with an ultraviolet light or an electron beam to form the light transmission layer.

2. The method for producing an optical recording medium according to claim 1, wherein the resin composition is substantially free from a solvent.

3. The method for producing an optical recording medium according to claim 1, wherein the resin composition comprises:
40-95 wt. % of the radical-curing urethane (meth)acrylate (A); and
5-60 wt. % of the radical-curing monomer (B).

4. The method for producing an optical recording medium according to claim 1, wherein the coating film is cured by being irradiated with the ultraviolet light, and wherein the resin composition further comprises 1-5 wt. % of (C) a photopolymerization initiator.

5. The method for producing an optical recording medium according to claim 4, wherein the photopolymerization initiator (C) is an acetophenone-based photopolymerization initiator and/or a benzophenone-based photopolymerization initiator, and wherein the photopolymerization initiator (C) is free from a compound having a thioxanthone skeleton, a phosphine oxide skeleton or a titanocene skeleton.

6. The method for producing an optical recording medium according to claim 1, wherein the lubricant (D) has at least one radical-reactive group per one molecule thereof, and wherein the lubricant (D) has a weight average molecular weight of 10,000 or less.

7. The method for producing an optical recording medium according to claim 1, wherein the ultraviolet light or the electron beam is irradiated under an oxygen-poor atmosphere of an oxygen concentration of 1,000 ppm or less.

8. The method for producing an optical recording medium according to claim 1, wherein the light transmission layer has a hardness smaller than that of the supporting substrate.

9. The method for producing an optical recording medium according to claim 1, wherein the supporting substrate comprises a polycarbonate or a polyolefin.

10. An optical recording medium comprising:
a supporting substrate;
a light transmission layer, which transmits a laser beam; and
an information layer formed between the supporting substrate and the light transmission layer,
wherein the light transmission layer is produced by a method comprising:
applying a resin composition on the information layer by a spin coating method to form a coating film,
wherein the resin composition comprises:
(A) a radical-curing urethane (meth)acrylate produced by a process comprising reacting (a-1) a compound having three or more isocyanate groups binding to an aliphatic carbon atom per one molecule thereof and (a-2) a polycaprolacton-modified hydroxyethyl (meth)acrylate;
(B) a radical-curing monomer having a viscosity of 400 mPa·s or less at 25° C.
(D) 0.1-5 wt. % of at least one lubricant selected from the group consisting of a fatty acid ester-based lubricant, a silicone-based lubricant and a fluorine compound-based lubricant; and
curing the coating film by irradiating the coating film with an ultraviolet light or an electron beam to form the light transmission layer.

11. The optical recording medium according to claim 10, wherein the resin composition comprises:
40-95 wt. % of the radical-curing urethane (meth)acrylate (A); and
5-60 wt. % of the radical-curing monomer (B).

12. The optical recording medium according to claim 10, wherein the resin composition is substantially free from a solvent.

13. The optical recording medium according to claim 10, wherein the coating film is cured by being irradiated with the ultraviolet light, and wherein the resin composition further comprises 1-5 wt. % of (C) a photopolymerization initiator.

14. The optical recording medium according to claim 13, wherein the photopolymerization initiator (C) is an acetophenone-based photopolymerization initiator and/or a benzophenone-based photopolymerization initiator, and wherein the photopolymerization initiator (C) is free from a compound having a thioxanthone skeleton, a phosphine oxide skeleton or a titanocene skeleton.

15. The optical recording medium according to claim 10, wherein the lubricant (D) has at least one radical-reactive group per one molecule thereof, and wherein the lubricant (D) has a weight average molecular weight of 10,000 or less.

16. The optical recording medium according to claim 10, wherein the ultraviolet light or the electron beam is irradiated under an oxygen-poor atmosphere of an oxygen concentration of 1,000 ppm or less.

17. The optical recording medium according to claim 10, wherein the light transmission layer has a hardness smaller than that of the supporting substrate.

18. The optical recording medium according to claim 10, wherein the supporting substrate comprises a polycarbonate or a polyolefin.

19. The method for producing an optical recording medium according to claim 6, wherein the lubricant (D) is reacted with the radical-curing monomer (B).

20. The optical recording medium of claim 15, wherein the lubricant (D) is reacted with the radical-curing monomer.

21. The method for producing an optical recording medium according to claim 1, wherein the method produces an optical recording medium having no hard coat layer on the light incident surface of the light transmission layer.

22. The optical recording medium according to claim 10, wherein no hard coat layer is present on the light incident surface of the light transmission layer.

23. The method for producing an optical recording medium according to claim 19, wherein the lubricant (D) is present in an amount of 0.1-5% by weight in the resin composition.

24. The optical recording medium according to claim 20, wherein the lubricant (D) is present in an amount of 0.1-5% by weight in the coating film.

25. The method for producing an optical recording medium according to claim 19, wherein the lubricant (D) has an ethylenically unsaturated group reacted with the radical-curing monomer (B).

26. The optical recording medium according to claim 15, where the lubricant (D) includes an ethylenically unsaturated group reacted with the radical-curing monomer (B).

27. The method for producing an optical recording medium according to claim 1, wherein the light transmission layer is an outermost layer.

28. The optical recording medium according to claim 10, wherein the light transmission layer is an outermost layer.

* * * * *